United States Patent

Fujiwara et al.

Patent Number: 5,249,076
Date of Patent: Sep. 28, 1993

[54] OPTICAL FILTER STRUCTURE

[75] Inventors: Shigetoshi Fujiwara, Hachioji; Yoshio Kishima, Kasukabe; Tadasu Inoue, Matsudo, all of Japan

[73] Assignee: Hoya Corporation, Tokyo; Dainippon Plastics Co., Ltd., Osaka, both of Japan

[21] Appl. No.: 934,318

[22] Filed: Aug. 25, 1992

[30] Foreign Application Priority Data

Aug. 30, 1991 [JP] Japan .................. 3-220691

[51] Int. Cl.⁵ .................. C03C 3/247; C03C 3/16; C03C 4/08; G02B 5/22
[52] U.S. Cl. .................. 359/350; 359/361; 501/44; 501/45; 501/905
[58] Field of Search .................. 359/350, 361; 501/44, 501/45, 905

[56] References Cited

U.S. PATENT DOCUMENTS

| | | | |
|---|---|---|---|
| 4,615,989 | 10/1986 | Ritze | 501/44 |
| 4,771,020 | 9/1988 | Onata et al. | 501/905 |
| 4,859,637 | 8/1989 | Roberts | 501/25 |
| 5,173,212 | 12/1992 | Speit et al. | 501/905 |

OTHER PUBLICATIONS

JIS B 7751, "Light-Exposure and Light-and-Water-Exposure Apparatus", 1990.
JIS B 7753, "Light-and Water-Exposure Apparatus", 1988.
JIS B 7754, "Light-Exposure and Light-and-Water-Exposure Appratus", 1991.

Primary Examiner—Martin Lerner
Attorney, Agent, or Firm—Nixon & Vanderhye

[57] ABSTRACT

Provided is an optical filter structure which has excellent solarization resistance, and stably gives a constant wavelength distribution and constant irradiation energy for a long time, and which efficiently cuts off infrared light including near infrared light and ultraviolet light having a short wavelength and is sufficiently permeable to visible light. The optical filter structure has a glass filter 7 formed of phosphate or fluorophosphate glass containing 0.1 to 5% by weight, as an oxide, of copper oxide and an aquafilter 6 having a liquid layer 5 measuring 3 to 50 mm as a light path length, the glass filter 7 being placed either outside a container wall, 2a or 2b, of the aquafilter 6 or within the liquid layer 5, and the optical filter structure has optical characteristics that the absorption edge on a short wavelength side is a region of light having a wavelength of 250 to 330 nm and that the maximum value of the spectral transmittance on a long wavelength side beyond 780 nm is not more than 40%.

20 Claims, 14 Drawing Sheets

OPTICAL FILTER STRUCTURE

Field of the Invention

The present invention relates to an optical filter structure, more specifically to an optical filter structure to transmit, as light having desired spectral distribution characteristics, light from an artificial light source which radiates ultraviolet light and infrared light in addition to visible light. The optical filter structure of the present invention is useful when used, particularly, in a weathermeter or a light resistance tester (to be sometimes generically referred to as "weathermeter" hereinafter).

Prior Art

In product development, raw materials such as plastics, pigments and coating compositions and products produced therefrom are required to be examined on their environmental resistance under environmental conditions in which these raw materials and products are to be used. A weathering test is therefore widely conducted. Since this weathering test is mainly aimed at obtaining, within a short period of time, the same results as those to be obtained by exposure to a natural outdoor environment for a long time, it is carried out as an accelerating test by means of a weathermeter equipped with a light source which radiates light having a predetermined wavelength distribution and irradiation energy.

Meanwhile, the spectral distribution of light radiated by an artificial light source greatly differs from the spectral distribution of light required for a weathering test. In the light source device of a weathermeter, therefore, the wavelength distribution and irradiation energy of light radiated from a light source of a specific kind are properly controlled with a glass filter having specific spectral transmittance characteristics depending upon test purposes.

As a glass filter for use in the light source device of a weathermeter, for example, there are known glass filters having spectral transmittance characteristics specified in JIS B 7751(—1990), JIS B 7753(—1988) and JIS B 7754 (—1989). These glass filters include a glass filter formed of silicate glass containing $Fe^{3+}$, $Ce^{4+}$ or $Ti^{3+}$ (to be sometimes referred to as glass filter(s) A hereinafter) and a glass filter formed of phosphate or silicate glass containing $Fe^{2+}$ (to be sometimes referred to as glass filter(s) B hereinafter). Glass filters A are used in combination with a sunshine carbon arc lamp for cutting off ultraviolet light, and a selection is properly made among them to suit a test purpose. Glass filters B refer to those which are generally called heat-absorbing glass filter, and used in combination with a xenon arc lamp for cutting off ultraviolet light having a wavelength of 300 nm or smaller and infrared light having a wavelength of 800 nm or larger.

Further, as a glass filter for use in a light source device for a pretest of a weathering test, JP,A-60-117128 discloses a glass filter formed of silicate glass containing 1% Co and 1% Ni (to be sometimes referred to as glass filter C hereinafter). The pretester disclosed in this Publication uses a water-cooling jacket to prevent the temperature increase in the glass filter C and a light source. Although being slightly permeable to infrared light, this glass filter C is excellently permeable to ultraviolet light having a wavelength of 300 to 400 nm and suitable to obtain ultraviolet light having a wavelength of 300 nm to 400 nm very effectively when used in combination with a metal halide lamp. For this reason, the glass filter C is actually used as a glass filter of the light source device of a weathermeter for concentrated irradiation with ultraviolet light having a wavelength of 300 to 400 nm while cutting off ultraviolet light having a wavelength of not more than 295 nm to obtain light identical to sunlight reaching the surface of the earth.

Since, however, a weathering test and a pretest of a weathering test are generally carried out as an accelerating test, the artificial light source of a light source device radiates large quantities of ultraviolet light and infrared light in wavelength regions particularly required for acceleration of deterioration of a substance to be tested. For example, a xenon arc lamp radiates light in an infrared region (800 to 1,000 nm) in a remarkably large quantity as compared with light in ultraviolet and visible light regions. When it is attempted to carry out a test with an artificial accelerating weathermeter using a xenon lamp while increasing the energy intensity, the temperature of a sample (substance to be tested) increases due to an increase in the light quantity in an infrared region, and it is therefore difficult to carry out the test at a low temperature (e.g., 50° C.). A high-voltage mercury lamp radiates a considerable quantity of light around 1,000 nm, and in an Sn type metal halide lamp, the proportion of radiated light in the 760 to 2,600 nm region reaches about 50% of the total of radiated light. Therefore, conventional weathermeters and conventional pretesters of a weathering test have the following problems.

A glass filter A has a high transmittance for light in a region from near infrared light to a longer wavelength side as its typical transmittance curve is shown by a solid line in FIG. 10. The glass filter A therefore has a problem in that the quantity of transmitted infrared light is too large when it is used in combination with an artificial light source radiating a large quantity of infrared light such as a metal halide lamp or a xenon arc lamp. When the quantity of infrared light permeating a filter in a weathermeter is large, a substance to be tested in a sample chamber reaches a very high temperature due to infrared light which has permeated the filter. It is therefore required to increase the cooling capacity of a tester when, for example, a polyvinyl chloride resin having low heat resistance is tested on its weathering resistance, which requirement makes the tester complicated and causes a cost increase.

Slightly absorbing light in a visible light region, a glass filter B efficiently absorbs infrared light as its typical transmittance curve is shown by a dotted line in FIG. 10. And, the glass filter B shows relatively desirable transmittance characteristics at an initial stage of its use. However, the glass filter B is greatly affected by solarization due to ultraviolet light with the passage of time in use as shown by a dotted line in FIG. 13, and the absorption of light in an ultraviolet region increases to a great extent. Therefore, the glass filter B has a problem in that it cannot be stably used for a long time since the wavelength distribution of transmitted light changes with time, and that it is difficult to carry out a test with good repeatability.

A glass filter C is permeable to part of infrared light as well, as its typical transmittance curve is shown by a chain line in FIG. 10. The glass filter C therefore has a problem similar to that of the glass filter A. Further, since the glass filter C absorbs a large quantity of light in a visible light region, it has a problem in that it cannot be used for studying an influence by visible light.

The glass filter A and the glass filter C as well as the glass filter B have a problem in that these glass filters A and C cause solarization due to intense ultraviolet light radiated from an artificial light source as shown in FIG. 12, although the degree of the solarization is not so large as that of the solarization caused by the glass filter B, and that the transmittance for light from ultraviolet to visible light decreases with the passage of irradiation time. Therefore, these glass filters A, B and C cannot be stably used for a long time, and are required to be periodically replaced. For example, JIS B 7753(—1988) specifies a method in which 2 filter elements are replaced at intervals of 500 hours for a filter consisting of 8 filter elements. JIS B 7751 (—1990) and JIS B 7754 (—1989) specify a method in which a filter is replaced at intervals of 2,000 hours. The above replacement of glass filters involves troublesome procedures to users and imporses a burden of money on users.

SUMMARY OF THE INVENTION

It is therefore an object of the present invention to provide an optical filter structure which is excellent in solarization resistance, which stably gives a constant wavelength distribution and a constant irradiation energy for a long period of time, and which effectively cuts off infrared light including near infrared light and short wavelength ultraviolet light and is sufficiently permeable to visible light.

According to the present invention, the above objects and advantages of the present invention are achieved by an optical filter structure (I) comprising a glass filter formed of phosphate or fluorophosphate glass containing 0.1 to 5% by weight, as an oxide, of copper oxide and an aquafilter having a liquid layer having a light path length of 3 to 50 mm, (II) said glass filter being positioned outside a wall of a container of said aquafilter or within said liquid layer, and (III) an absorption edge on a short wavelength side being in the range of from 250 to 330 nm, and the maximum of a spectral transmittance for light on a long wavelength side beyond 780 nm being not more than 40%.

DETAILED DESCRIPTION OF THE INVENTION

The present invention will be detailed hereinafter.

As described above, the optical filter structure of the present invention has a glass filter and an aquafilter (constituted by holding or circulating pure water or the like in a transparent container having a light-incoming surface and a light-outgoing surface), and the glass filter is formed of phosphate or fluorophosphate glass containing 0.1 to 5% by weight, as an oxide, of copper oxide.

Figure 11:
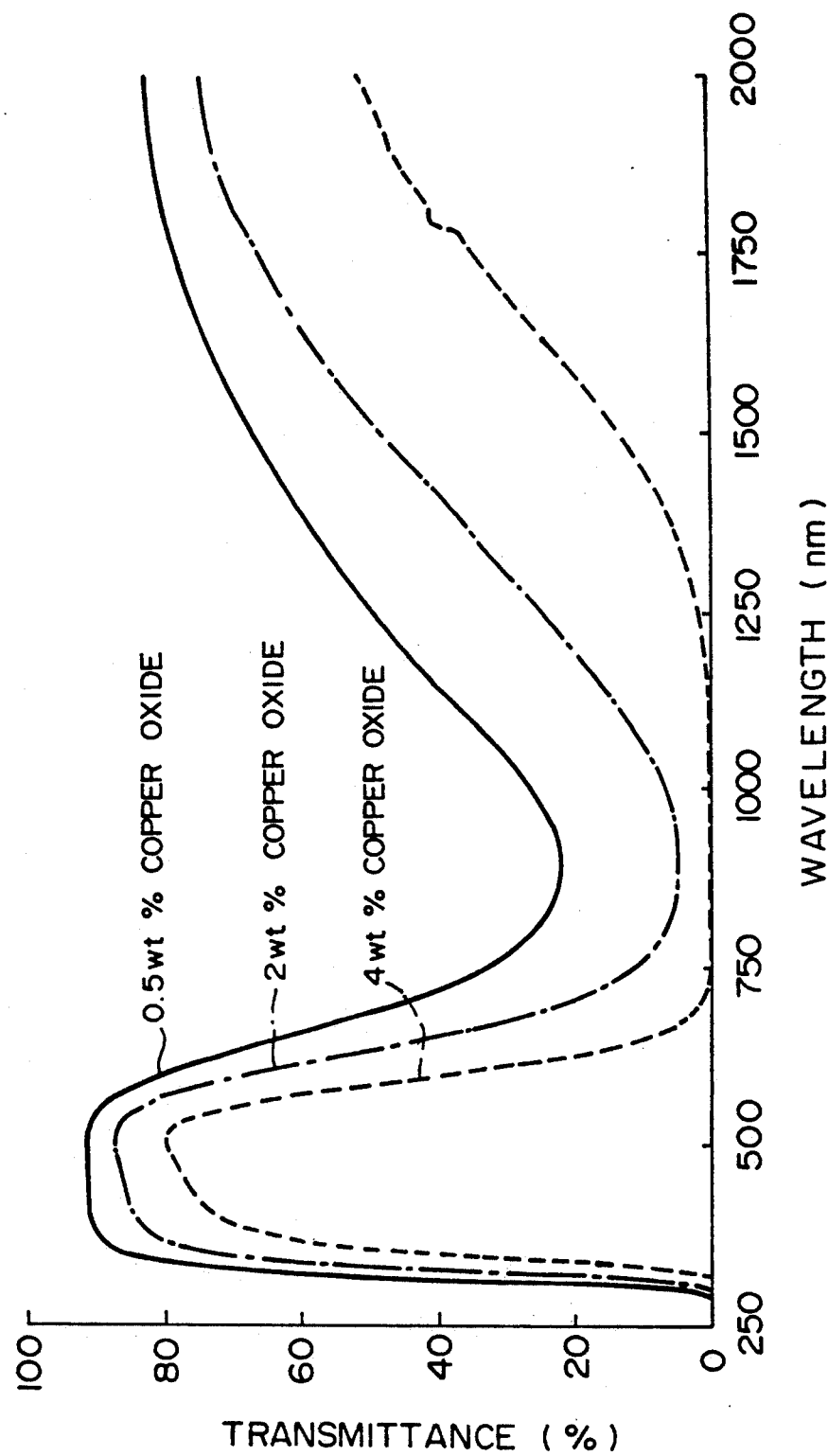
FIG. 11 shows the transmittance curve of a glass filter used in an optical filter structure of the present invention.

The glass filter of the above composition not only efficiently cuts off near infrared light which causes an increase in the temperature of a substance to be tested in a weathermeter, but also efficiently cuts off ultraviolet light in a region from far ultraviolet light to intermediate ultraviolet light. The transmittance for ultraviolet light and infrared light can be adjusted on the basis of a copper oxide content as shown in FIG. 11. In FIG. 11, the solid line shows the transmittance curve of a phosphate glass filter containing 0.5% by weight of copper oxide (indicated as 0.5 wt % copper oxide), the chain line shows the transmittance curve of a phosphate glass filter containing 2% by weight of copper oxide (indicated as 2 wt % copper oxide), and the dotted line shows the transmittance curve of a phosphate glass filter containing 4% by weight of copper oxide (indicated as 4 wt % copper oxide). Each of these glass filters had a glass composition, excluding copper oxide, of $85P_2O_5$-$12Al_2O_3$-$3MgO$, the proportions being based on weight percentage, and each of these glass filters had a thickness of 1.0 mm. The glass filter used in the present invention does not have any large absorption in a visible light region, while the transmittance for visible light can be controlled by changing the filter thickness.

Figure 12:
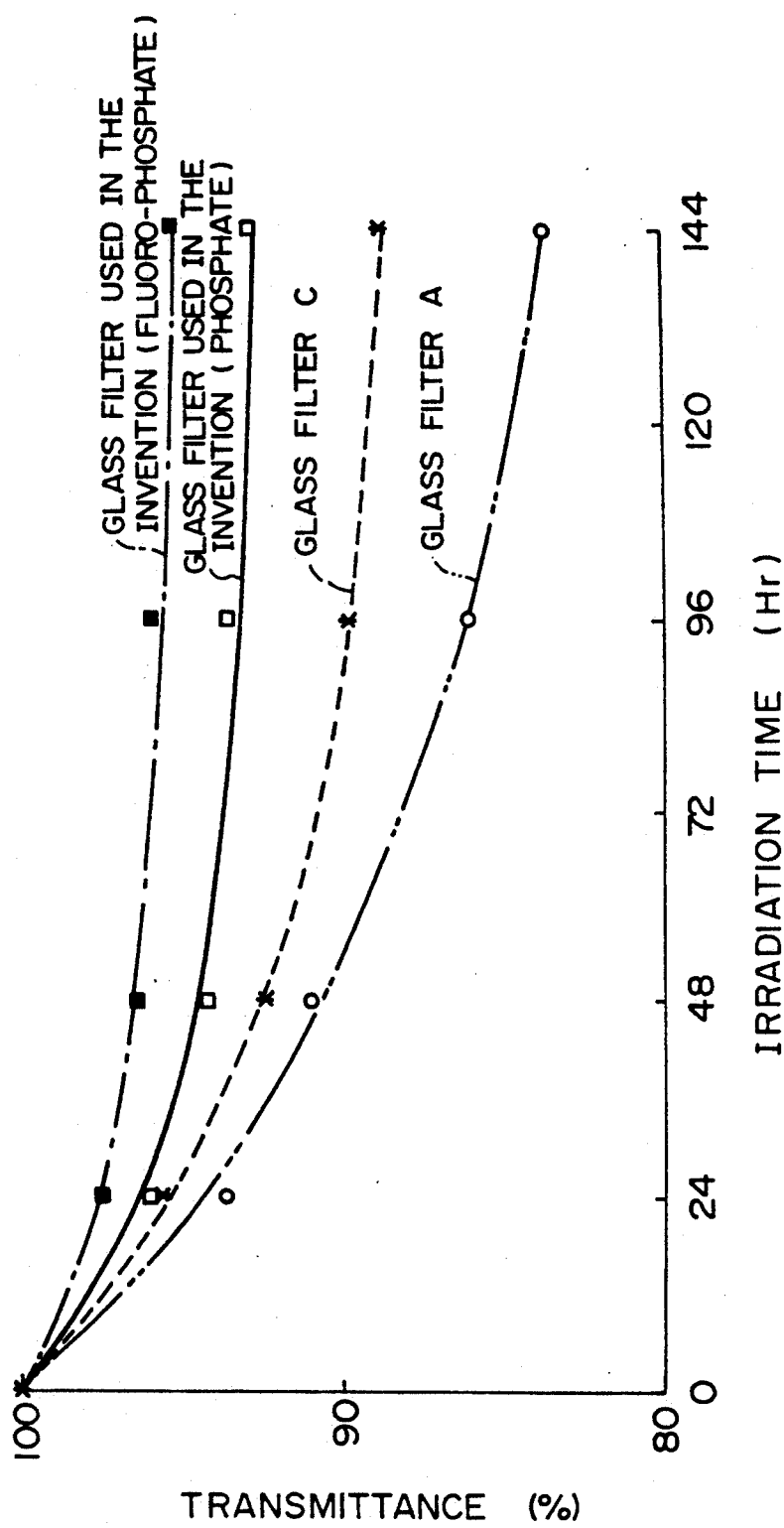
FIG. 12 shows the results of solarization resistance tests of a glass filter for use in an optical filter structure of the present invention and conventional glass filters A and B.
Figure 13:
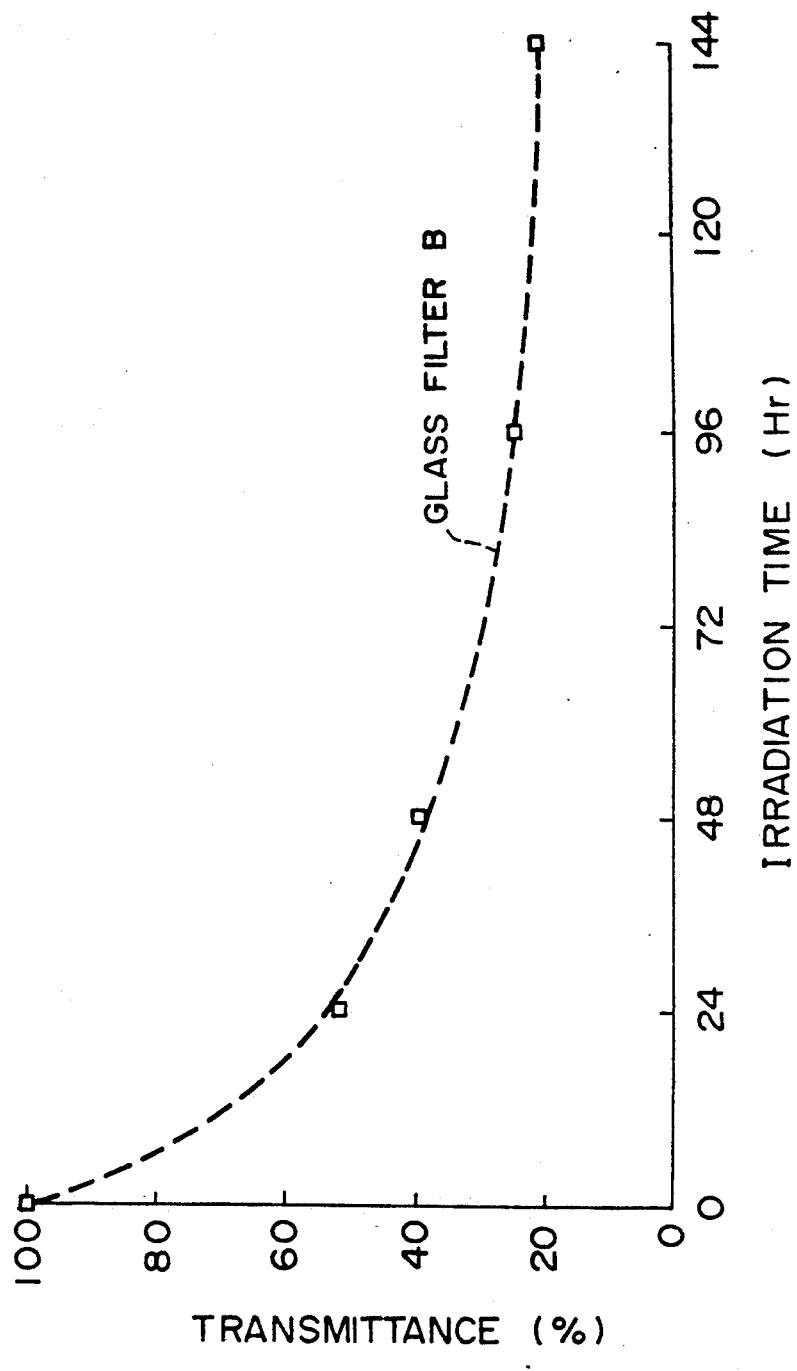
FIG. 13 shows the result of solarization resistance test of a conventional glass filter B.

Further, as is clear from FIGS. 12 and 13, the glass filter used in the present invention has excellent solarization resistance over conventional glass filters. In FIGS. 12 and 13, lines show changes in the transmittance of glass filters shown below at a wavelength of 320 nm with time. The test conditions were as described in a solarization resistance test which will follow later.

FIG. 12

Solid line ... phosphate glass filter used in the present invention (copper oxide content: 0.5 wt %, composition excluding copper oxide: $85P_2O_5$-$12Al_2O_3$-$3MgO$ (by weight percent), thickness: 1 mm)

Chain line ... Fluorophosphate glass filter used in the present invention (copper oxide content: 1.5 wt %, composition excluding copper oxide: $28P_2O_5$-

10AlF$_3$-5MgF$_2$-10CaF$_2$-19SrF$_2$-15BaF$_2$-8Al$_2$O$_3$-4Li$_2$O (by weight percent), thickness: 1 mm)

Two-dot chain line ... glass filter A (glass composition: 81SiO$_2$-13B$_2$O$_3$-2Al$_2$O$_3$-4Na$_2$O-0.03Fe$_2$O$_3$ (by weight percent), thickness: 2.5 mm)

Dotted line ... glass filter C (glass composition: 65SiO$_2$-18PbO-7Na$_2$O-8K$_2$O-1CoO-1NiO (by weight percent), thickness: 1 mm)

FIG. 13 (dotted line)

Glass filter B (glass composition: 80P$_2$O$_5$-12Al$_2$O$_3$-4MgO-2ZnO-1K$_2$O-2.2Fe$_3$O$_4$ (by weight percent), thickness: 3 mm)

The absorption edge of the optical filter structure of the present invention on a short wavelength side is actually defined by the absorption edge of the glass filter of the present invention on a short wavelength side. The absorption edge of this glass filter on a short wavelength side is required to be in the range of 250 to 330 nm, while it is particularly preferably in 295 to 330 nm for use in a weathermeter. When the absorption edge on a short wavelength side is in a region of light having a wavelength longer than 330 nm, the quantity of ultraviolet light is too small for use in a weathermeter, and the accelerating characteristic thereof is impaired. When the absorption edge on a short wavelength side is in a region of light having wavelength shorter than 250 nm, undesirably, the maximum of the spectral transmittance for light on a long wavelength side beyond 780 nm cannot be controlled to not more than 40%. For use in a weathermeter, it is preferred to control the absorption edge on a short wavelength side into a region of light having a wavelength of not less than 295 nm, since sunlight reaching the surface of the earth contains no light having a wavelength of not more than 295 nm.

The absorption edge of the glass filter used in the present invention on a short wavelength side can be adjusted on the basis of the copper oxide content and the glass filter thickness (light path length). When, however, the copper oxide content is less than 0.1% by weight, practically undesirably, the glass filter thickness is required to be extremely increased to bring the absorption edge on a short wavelength side into the above range. On the other hand, when the copper oxide content exceeds 5% by weight, undesirably, the transmittance for light from near ultraviolet to visible light decreases. The content of copper oxide in the glass filter used in the present invention is therefore limited to 0.1 to 5% by weight.

When the glass containing 0.1 to 5% by weight of copper oxide, used in the present invention, is phosphate glass or fluorophosphate glass, nearly similar solarization resistance and nearly similar transmittance characteristics can be obtained regardless of its glass composition. The glass composition is properly selected depending upon intended use of the optical filter structure and in view of the solubility of raw materials and anti-devitrification properties, chemical durability, mechanical strength or thermal expansion coefficient of glass to be obtained. For example, the following compositions (excluding copper oxide) are preferred for the phosphate glass and fluorophosphate glass in view of the solubility of raw materials and the anti-devitrification properties, chemical durability, etc., of glass to be obtained.

Phosphate glass (as oxides)

| | | |
|---|---|---|
| P$_2$O$_5$ | 40-85 wt % | |
| Al$_2$O$_3$ | 3-20 wt % | |
| RO | 0-30 wt % | (RO is oxide of divalent metal) |
| R$_2$O | 0-10 wt % | (R$_2$O is oxide of monovalent metal) |
| RO + R$_2$O | 3-40 wt % | |

Fluorophosphate glass (as oxides, excluding F)

| | | |
|---|---|---|
| P$_2$O$_5$ | 5-45 wt % | |
| Al$_2$O$_3$ | 2-25 wt % | |
| RO + R$_2$O | 7-60 wt % | (RO is oxide of divalent metal and R$_2$O is oxide of monovalent metal) |
| F | 5-30 wt % | |

The above phosphate glass and fluorophosphate glass can be obtained by a conventional method for producing phosphate glass and fluorophosphate glass except for incorporating a raw material which finally becomes copper oxide. The glass filter used in the present invention may contain a small amount (not more than 3% by weight in total) of colorants such as Ni, Co, Mn, Cr, Ti, Ce and Nd for adjusting the absorption edge and the transmittance for visible light.

The optical filter structure of the present invention uses an aquafilter in combination with the above glass filter. The aquafilter cuts off infrared light having a wavelength longer than about 1,400 nm nearly 100 percent and works together with the above glass filter to decrease the maximum value of the spectral transmittance for near infrared light having a wavelength of from about 780 nm to about 1,400 nm to 40% or less.

The above aquafilter can be obtained by filling a liquid for filter such as pure water in a container having two parallel, plane, colorless plates held at a predetermined interval as a light-incoming surface and a light-outgoing surface. In this case, the distance between the two transparent plates (internal dimension), i.e., a light path length of a liquid layer formed from the liquid for filter, is preferably 3 to 50 mm.

Figure 14:
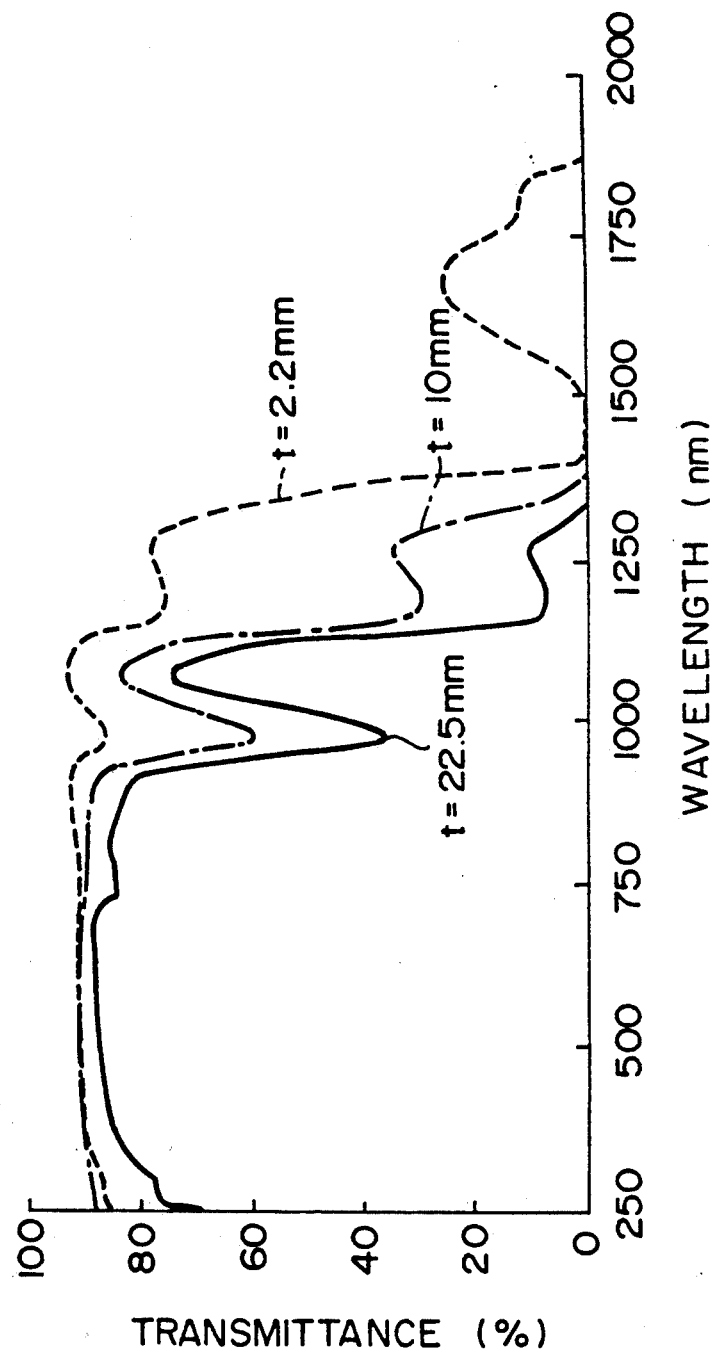
FIG. 14 shows the relationship between the light path length of a liquid layer constituting an aquafilter and the transmittance thereof.

As shown in FIG. 14, the transmittance for near infrared light decreases with an increase in the light path length. When the light path length is 2.2 mm, decreasing near infrared light having a wavelength longer than about 780 nm and cutting off infrared light are insufficient as shown by a dotted line (indicated at t=2.2 mm) in FIG. 14. In both cases when the light path length is 10 mm and when it is 22.5 mm, infrared light having a wavelength longer than about 1,400 nm is sufficiently cut off as shown by a chain line (indicated as t=10 mm) and a solid line (indicated as t=22.5) in FIG. 14. Since, however, the absorption in an ultraviolet region increases with an increase in the light path length, the light path length longer than necessary is undesirable when sufficient ultraviolet light is required. All the aquafilters of which the transmittance curves are shown in FIG. 14 use silica glass having a thickness of 1 mm for containers.

In view of the above, therefore, the light path length of less than 3 mm is undesirably insufficient for cutting off infrared light having a wavelength longer than about 1,400 nm. At the same time, the transmittance for light having wavelength of about 1,150 nm and the transmittance for light having a wavelength of about 1,270 nm increase. Therefore, the maximum value of the spectral transmittance for near infrared light having a wavelength from about 780 nm to about 1,400 nm can be no longer decreased to not more than 40% even if such an aquafilter works together with the above glass filter (containing copper oxide). When the maximum value of the spectral transmittance for light in a region of light having a wavelength longer than 780 nm exceeds 40% while the aquafilter works together with the above glass filter, the quantity of transmitted near infrared light increases which is one of factors which cause an increase in the temperature of substance to be tested in a weathermeter. It is therefore necessary to increase the cooling capability. When the light path length exceeds 50 mm, undesirably, the transmittance for light in an ultraviolet region from 300 to 400 nm particularly important for accelerating deterioration is inhibited. The light path length of the aquafilter used in the present invention is therefore limited to 3 to 50 mm.

The material for the container of the aquafilter used in the present invention may be selected from those which are excellent in solarization resistance and chemical durability and excellent in transmittance characteristics with which the absorption of light from intermediate ultraviolet light to near infrared light is small. Particularly preferred is silica glass. A container formed of silica glass has no problem on transmittance characteristics in practical use if the total thickness of silica glass (light path length of a container) is within 30 mm.

The liquid for filter can be selected not only from water and pure water but also from a solution prepared by adding or dissolving an inorganic acid salt of a metal (copper nitrate, iron sulfate or the like) to or in water or pure water for the purpose of absorbing light having a specific wavelength, and a mixture of water or pure water with an organic nitrogen sulfur-containing compound as an antiseptic. The aquafilter preferably has a structure in which the liquid for filter can be circulated to prevent an increase in the liquid temperature entailed by the absorption of infrared light and a consequent increase in the temperature of the aquafilter per se.

The optical filter structure having the foregoing glass filter and the above aquafilter, provided by the present invention, is constituted by placing the glass filter outside the container wall of the aquafilter or within the liquid layer. When the glass filter is placed outside the container wall of the aquafilter or within the liquid layer, the glass filter and the aquafilter are arranged in line on a light path.

When the glass filter is placed outside the container wall of the aquafilter, the glass filter may be arranged on any one of the light-incoming side and light-outgoing side of the aquafilter. However, from the viewpoint of preventing an increase in the temperature of the glass filter, it is preferred to place the glass filter on the light-outgoing side of the aquafilter. The glass filter may be placed at a predetermined distance from the container wall of the aquafilter, while it is preferred to place it in close contact with the container wall of the aquafilter. Placing the glass filter in close contact with the container wall of the aquafilter is not only efficient since the cooling effect of the liquid for filter can be utilized to prevent an increase in the temperature of the glass filter, but also contributes toward constituting a simple structure.

On the other hand, when the glass filter is placed within the liquid layer of the aquafilter, the position where the glass filter is to be placed is not specially limited, and the cooling effect of the liquid for filter can be sufficiently utilized to cool the glass filter. When the glass filter is placed within the liquid layer of the aquafilter, it is preferred to improve the water resistance of the glass filter by forming a coating excellent in solarization resistance and water resistance such as a coating of a fluorine resin on the surface of the glass filter.

In the optical filter structure having the above-described constitution, provided by the present invention, the glass filter mainly efficiently cuts off light of from intermediate ultraviolet light to far ultraviolet light, and the absorption edge on the short wavelength side is in the region of from 250 to 330 nm. The optical filter structure of the present invention efficiently cuts off near infrared light and infrared light by means of the glass filter and the aquafilter, and the maximum value of the spectral transmittance for light on a long wavelength side beyond 780 nm is not more than 40%. Therefore, when the optical filter structure of the present invention is used as part of the light source device of a weathermeter, an increase in the temperature of a substance under a test can be easily controlled, and the cooling capability can be reduced. Moreover, since both the glass filter and the aquafilter used in the present invention are excellent in solarization resistance, the change in the transmittance characteristics caused by solarization is small in the optical filter structure of the present invention, which exhibits stable transmittance characteristics for a long period of time.

EXAMPLES

Examples of the present invention will be explained hereinafter by reference to drawings.

EXAMPLE 1

Figure 1:
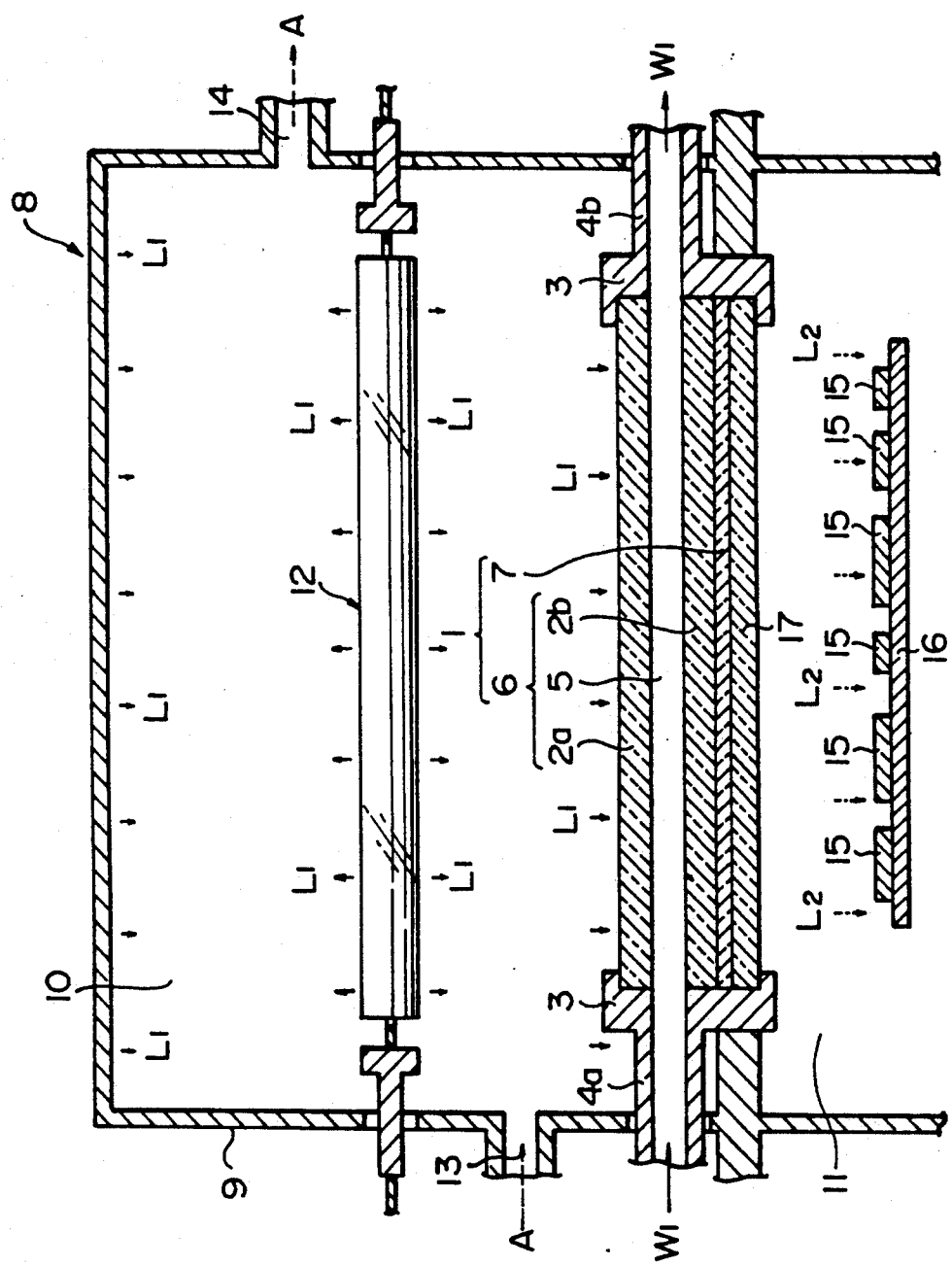
FIG. 1 is a schematic cross-sectional view of an accelerating weathermeter using an optical filter of the present invention.

An optical filter structure of the present invention used in the partition window portion of an accelerating weathermeter is shown in FIG. 1. As shown in FIG. 1, in an optical filter structure 1 of the present invention, two high-purity silica glass plates 2a and 2b (width 200 mm×length 500 mm×thickness 5 mm), each of which has polished surfaces, are held with a stainless steel frame 3 at a distance of 10 mm (corresponding to the light path length of a liquid layer) from each other. The stainless steel frame 3 is provided with a branch tube 4a for feeding water and a branch tube 4b for discharging water, and a space between the high-purity silica glass plates 2a and 2b forms a flow path for water 5. And, the high-purity glass plates 2a and 2b and water 5 (corresponding to a liquid layer) flowing in the direction of a solid line arrow $W_1$ in the space between these high-purity silica glass plates 2a and 2b constitute an aquafilter 6.

In the optical filter structure 1, further, a glass filter 7, which was formed of phosphate glass obtained by incorporating 0.5% by weight of CuO to a matrix glass composition of 85P$_2$O$_5$-12Al$_2$O$_3$-3MgO (the proportions being based on weight percentage) and had a size of width 200 mm×length 500 mm×thickness 1 mm, was tightly attached to the outer surface of the high-purity silica glass plate 2b, the outer surface corresponding to the light-outgoing surface of the aquafilter 6. This glass filter 7 is also held with the stainless steel frame 3.

FIG. 1 shows the essential portion of an accelerating weathermeter, i.e., a lamp chamber and a sample chamber. In an accelerating weathermeter 8 having such essential portion (to be sometimes referred to as accelerating weathermeter 8 or accelerating weathermeter hereinafter), a lamp chamber 10 having an aluminum wide band mirror 9 as a wall and a sample chamber 10 are partitioned with the optical filter structure 1 of the present invention having the aquafilter 6 and the glass filter 7. The lamp chamber 10 is provided with an artificial light source 12, and the artificial light source 12 is cooled with air (indicated by dotted-line arrows A) which is supplied through an air inlet 13 formed through a side wall of the lamp chamber 10 and discharged through an air outlet 14. Within the sample chamber 11, there is provided a bed 16 on which a sample (substance to be tested) 15 is to be placed. In a test, the atmosphere in the sample chamber 11 generally shows a relative humidity of 70% and a temperature of 60° to 70° C. Therefore, the outer surface of the glass filter 7 constituting the optical filter structure 1 is sealed with high-purity silica glass 17 having a thickness of 2 mm to protect the glass filter 7 from the above atmosphere.

In the accelerating weathermeter 8, light (indicated by solid-line arrows $L_1$) radiated from the artificial light source 12 provided in the lamp chamber 10 enters a light-incoming surface (high-purity silica glass plate $2a$) of the aquafilter constituting the optical filter structure 1 of the present invention directly or after it is reflected on the aluminum wide band mirror 9. Incident light to the high-purity silica glass plate $2a$ consecutively permeates the high-purity silica glass $2a$, water 5, the high-purity silica glass plate $2b$ and the glass filter 7, and then permeates the high-purity silica glass 17 to enter the sample chamber 11. Therefore, the sample 15 placed on the bed 16 in the sample chamber 11 is irradiated with light (indicated by dotted-line arrows $L_2$) which has permeated the optical filter structure 1 and the high-purity silica glass 17 as described above.

Figure 2:
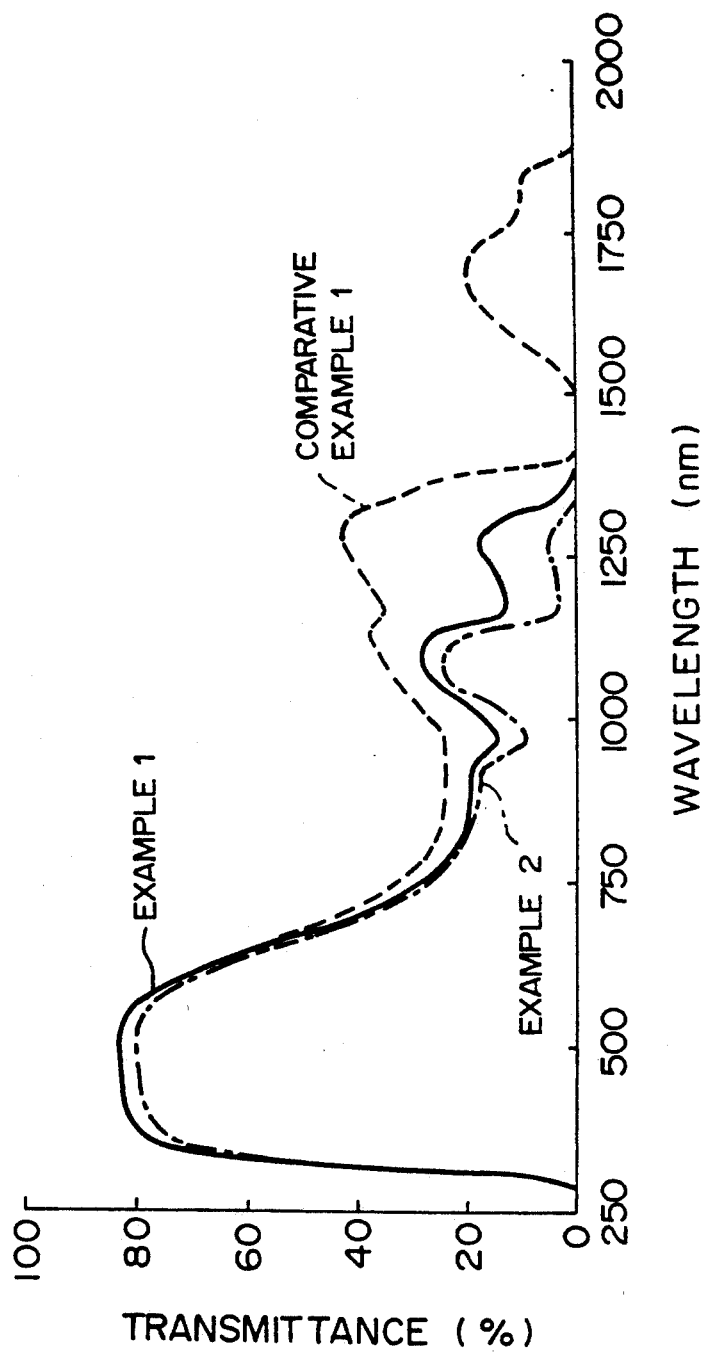
FIG. 2 shows transmittance curves of optical filter structures obtained in Example 1, Example 2 and Comparative Example 1.
Figure 3:
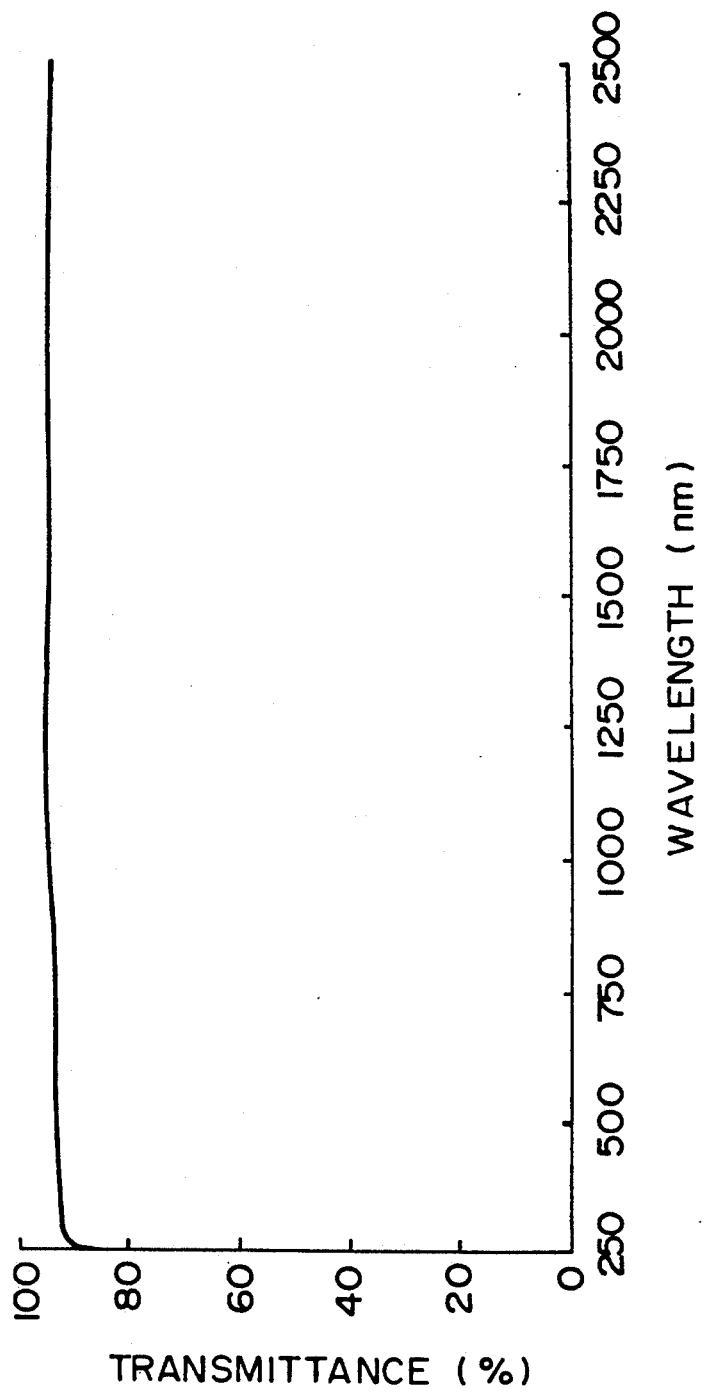
FIG. 3 shows the transmittance curve of high-purity silica glass (thickness 2 mm).

FIG. 2 shows the transmittance curve of the optical filter structure 1 by a solid line. As shown in FIG. 2, the absorption edge of the optical filter structure 1 on the short wavelength side is around 295 nm, and the maximum value of the spectral transmittance for light on a long wavelength side beyond 780 nm is about 28% (around 1,100 nm). And, the optical filter structure 1 is sufficiently permeable to light in a visible light region. For reference purpose, FIG. 3 shows the transmittance curve of a high-purity silica glass (thickness 2 mm).

EXAMPLE 2 AND COMPARATIVE EXAMPLE 1

There was formed an optical filter structure having the same constitution as that of the optical filter structure 1 of Example 1 except that the light path length of the liquid layer in the aquafilter was changed to 22.5 mm (Example 2). There was also formed an optical filter structure having the same constitution as that of the optical filter structure 1 of Example 1 except that the light path length of the liquid layer in the aquafilter was changed to 2.2 mm (Comparative Example 1).

FIG. 2 shows the transmittance curve of the optical filter structure of Example 2 by a chain line. FIG. 2 shows the transmittance curve of the optical filter structure of Comparative Example 1 by a dotted line. As shown in FIG. 2, the absorption edge of the optical filter structure of Example 2 on a short wavelength side is around 295 nm like the absorption edge of the optical filter structure 1. The maximum value of the spectral transmittance of the optical filter structure of Example 2 for light on a long wavelength side beyond 780 nm is about 24.5% (around 1,080 nm). On the other hand, the absorption edge of the optical filter structure of Comparative Example 1 on a short wavelength side is around 295 nm like the absorption edge of the optical filter structure 1, whereas the maximum value of the spectral transmittance of the optical filter structure of Comparative Example 1 for light on a long wavelength side beyond 780 nm is as high as about 42.5% (around 1,280 nm).

EXAMPLE 3

An optical filter structure was obtained in the same manner as in Example 1 except that the glass filter 7 was replaced with fluorophosphate glass containing 1.5% by weight of copper oxide (composition excluding the copper oxide: $28P_2O_5$-$10AlF_3$-$5MgF_2$-$10CaF_2$-$19SrF_2$-$15BaF_2$-$8Al_2O_3$-$4Li_2O$, proportions being based on weight percentage). And, an accelerating weathermeter was produced in which the above optical filter structure was applied to the partition window portion between a lamp chamber and a sample chamber in the same manner as in Example 1.

Figure 4:
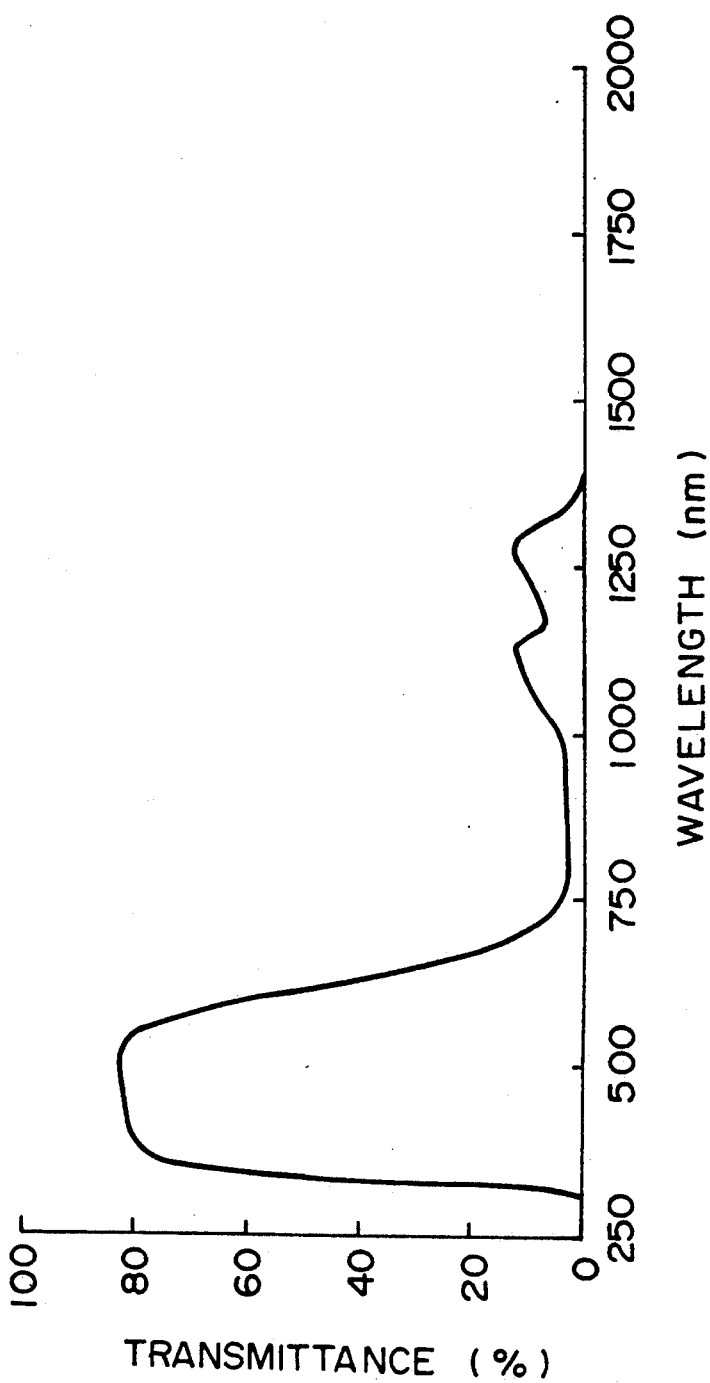
FIG. 4 shows the transmittance curve of an optical filter structure obtained in Example 3.

FIG. 4 shows the transmittance curve of the above optical filter structure. As shown in FIG. 4, the absorption edge of the optical filter structure on a short wavelength side is around 310 nm, and the maximum value of the spectral transmittance for light on a long wavelength side beyond 780 nm is about 12% (around 1,280 nm). This optical filter structure is sufficiently permeable to light in a visible light region.

For evaluation of the optical filter structures obtained according to the present invention, a solarization resistance test was carried out as follows.

SOLARIZATION RESISTANCE TEST

Figure 5:
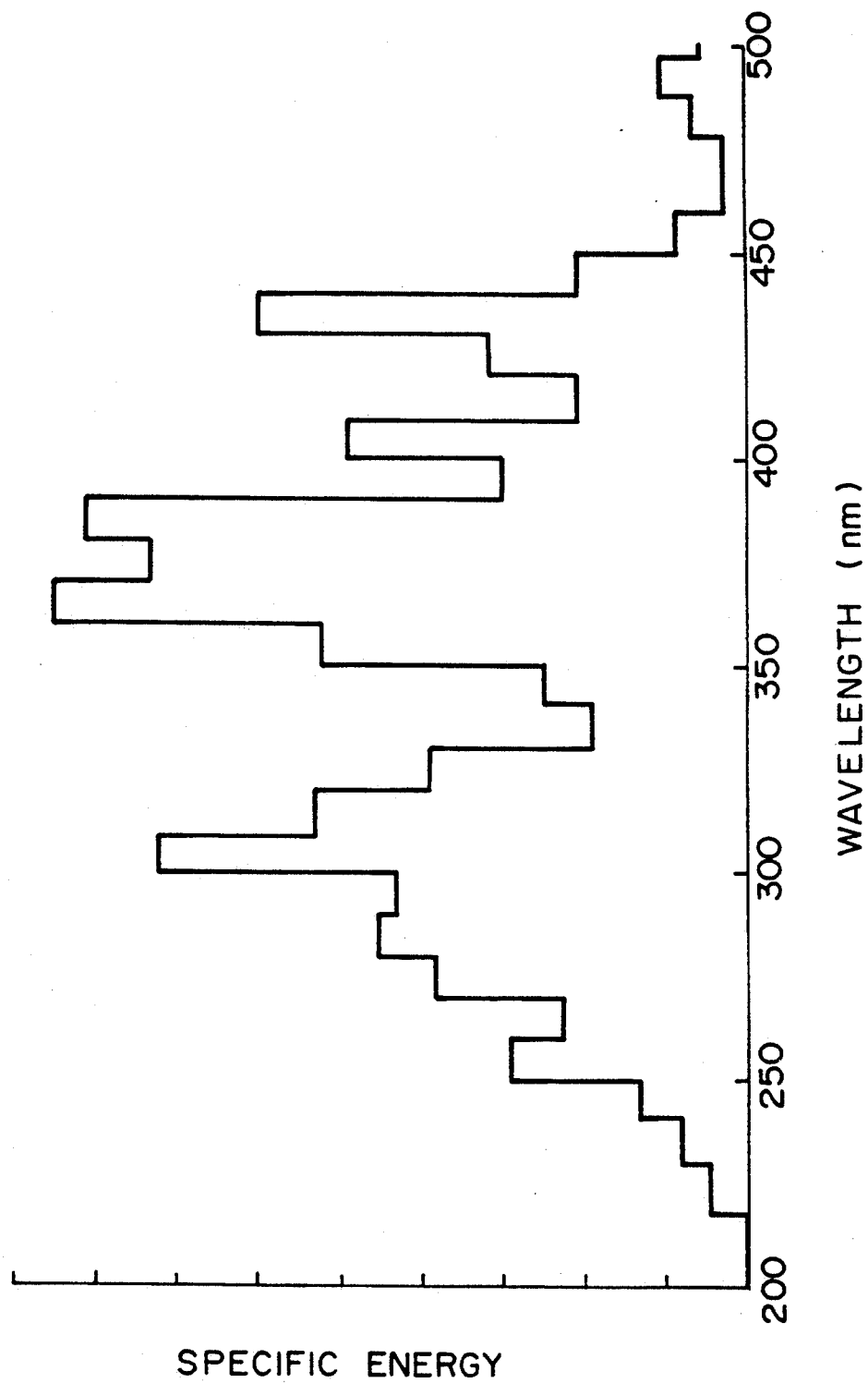
FIG. 5 shows the wavelength energy distribution of a metal halide lamp used in a solarization resistance test.

The accelerating weathermeter 8 of Example 1 was continuously operated for 144 hours, and the optical filter structure 1 was evaluated on solarization resistance on the basis of the transmittance characteristics thereof at 320 nm. In the test, a metal halide lamp (output: 4 kW) having a wavelength energy distribution shown in FIG. 5 was used as the artificial light source 12, and the flow rate of water 5 constituting the aquafilter 6 was set at 15 liters/minute. The temperature of a black panel was set at 70° C. as a reading of a black panel thermometer (not shown in FIG. 1) provided in the sample chamber 11 [the black panel thermometer was formed by connecting a thermocouple to the black panel arranged near a sample (substance to be tested) 15]. The output of the artificial light source 12 was adjusted such that the ultraviolet intensity (300 to 400 nm) on the surface of the glass filter 7 became 70 mW/cm$^2$.

For comparison, optical filter structures using the glass filters A, B and C as substitutes for the glass filter 7 were evaluated on solarization resistance.

Figure 6:
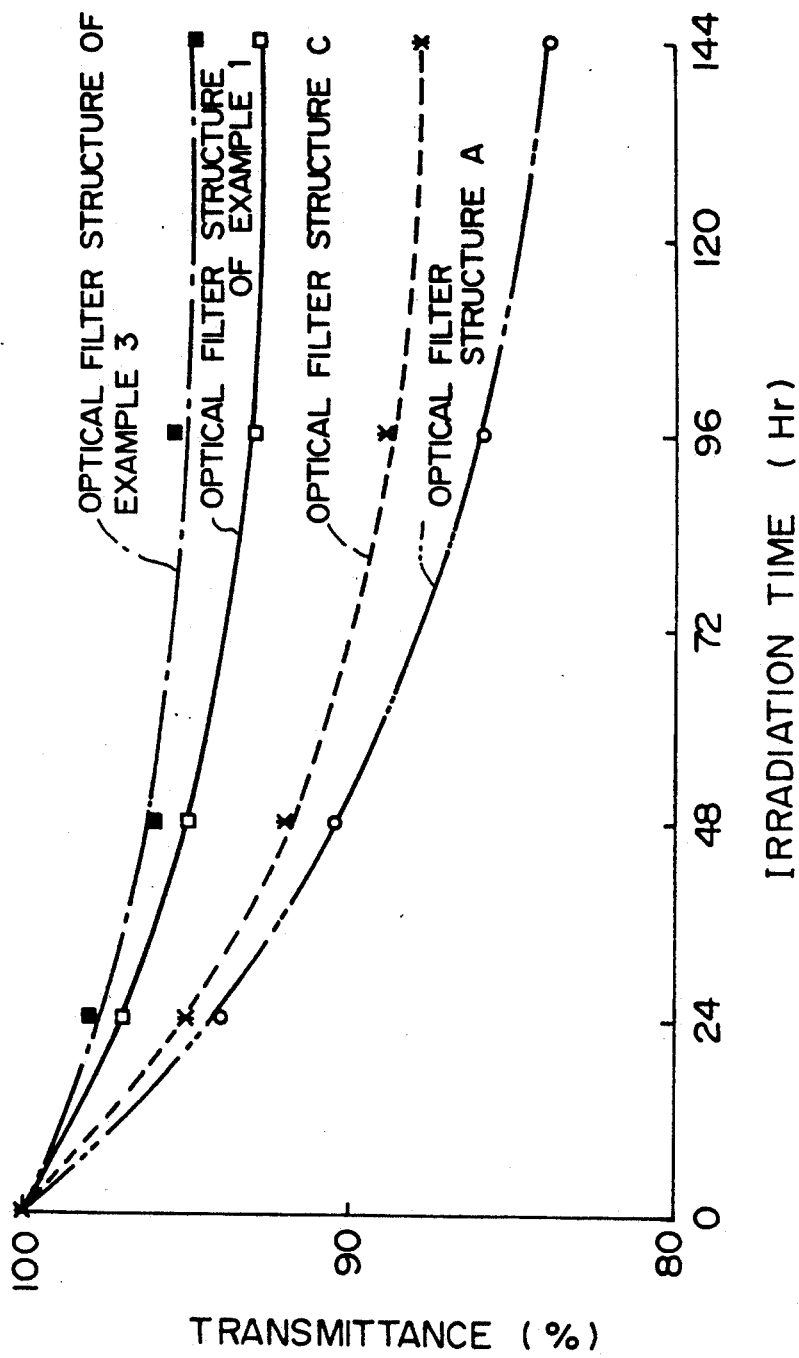
FIG. 6 shows the results of solarization resistance test of an optical filter structure of the present invention, an optical filter structure using a conventional glass filter A and an optical filter structure using a conventional glass filter C.
Figure 7:
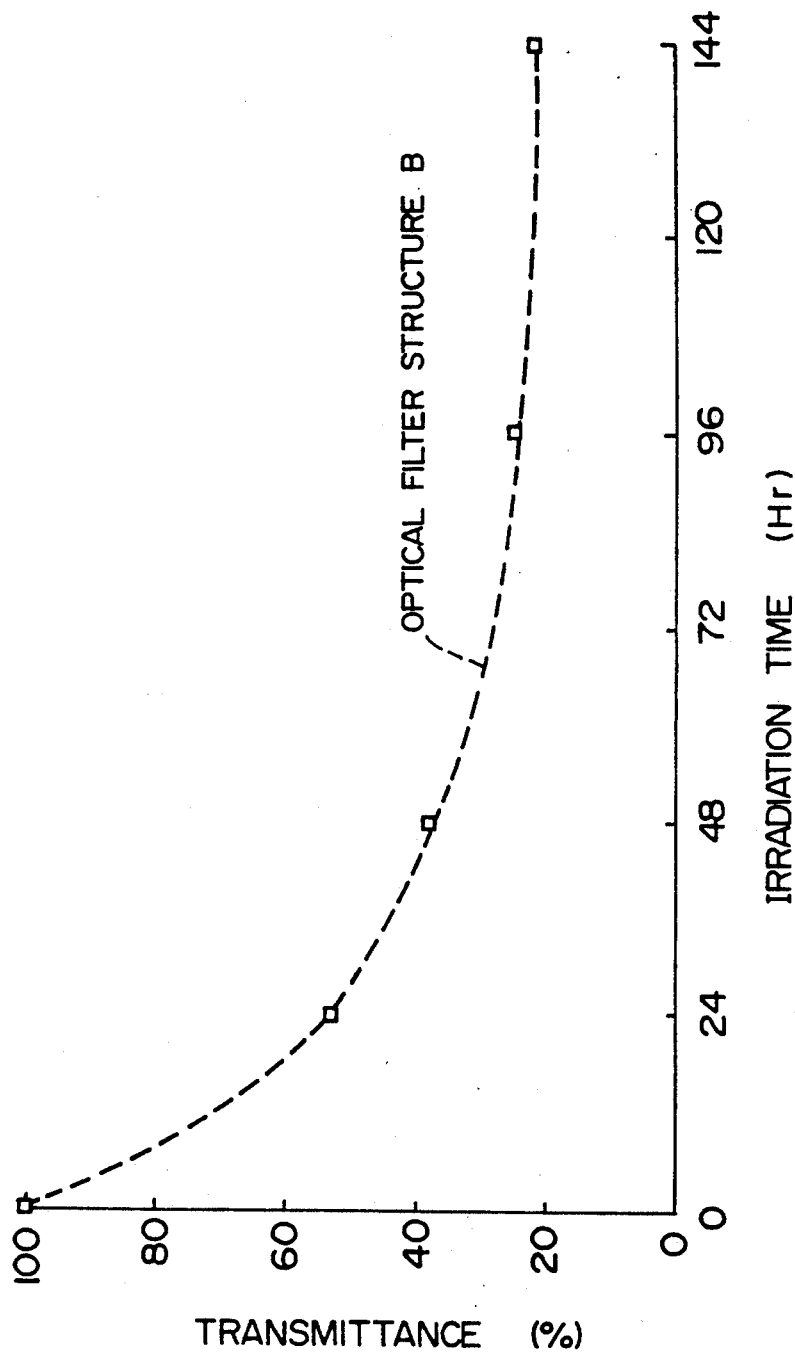
FIG. 7 shows the result of solarization resistance test of an optical filter structure using a conventional glass filter B.

FIGS. 6 and 7 show the results.

As is clear from FIG. 6, the optical filter structure of the present invention shows a small change in transmittance characteristics with time, and is excellent in solarization resistance. On the other hand, as shown in FIGS. 6 and 7, optical filter structures using conventional glass filters (indicated as an optical filter structure A, an optical filter structure B and an optical filter structure C, each of which is formed by combining one of the glass filters A, B and C with water and accordingly has a structure similar to that of the optical filter structure of the present invention) show a large change in the transmittance characteristics with time, and are inferior to the optical filter structure of the present invention in solarization resistance.

In addition, the optical filter structures obtained in Examples 2 and 3 were also tested in the same manner as above to show results similar to that of the optical filter structure of Example 1.

For the evaluation of an accelerating weathermeter using the optical filter structure of the present invention, optical filter structures were tested on the capability of preventing a temperature increase in the sample chamber as follows.

TEST ON CAPABILITY OF PREVENTING TEMPERATURE INCREASE IN SAMPLE CHAMBER

For studying the influence of each of glass filters used in the optical filter structure of the present invention and each of conventional glass filters on a temperature increase in the sample chamber, the temperature increase in the sample chamber was measured after 30 minutes' irradiation in an accelerating weathermeter produced in the same manner as in Example 1 (provided that the light path length was set at 5 mm). As an artificial light source, there was used a 60 W incandescent lamp (100 V, 57 W) which highly radiated infrared light to have a great influence on the temperature increase. The temperature in the sample chamber was measured as follows: A thermocouple was fixed in the central portion of a black (chromaticity; $L^* = 24.9$, $a^* = -0.2$, $b^* = -0.1$) polyethylene sheet (size; $40 \times 40 \times 0.25$ mm) having a surface roughness of 60 degrees and a gloss of 2.5, and a polyethylene sheet having the same color and the same size as those of the above polyethylene sheet was stacked thereon to sandwich the thermocouple between these polyethylene sheets. The marginal portions of these polyethylene sheets were sealed with an aluminum tape, and the so-prepared combination of the polyethylene sheets with the thermocouple in it was placed in the sample chamber and measured for a temperature.

Table 1 shows the results.

TABLE 1

| Kind of filter | Temperature increase in sample chamber Δ(°C.) | |
|---|---|---|
| | Filter alone | Optical filter structure*2 |
| Blank | 39.2–42.0 | — |
| Aquafilter*1 | 19.0–20.0 | — |
| Glass filter of Example 1 | 29.2–31.6 | 7.5–8.3 |
| Glass filter of Example 3 | 23.3–25.0 | 4.5–5.5 |
| Glass filter A | 38.0–39.0 | 17.5–19.0 |
| Glass filter B | 12.5–15.0 | 7.6–8.3 |
| Glass filter C | 11.0–12.5 | 9.0–10.0 |

*1: Light path length of liquid layer = 5 mm
*2: Combination of aquafilter (light path length of liquid layer = 5 mm) with glass filter As is found in Table 1 showing the results of the study of a temperature increase in the sample chamber, the temperature increase in the sample chamber after 30 minutes' irradiation when each of the glass filters is used alone is as follows; The phosphate glass filter (copper oxide 0.5 wt %) of Example 1 and the fluorophosphate glass (copper oxide 1.5 wt %) of Example 3, respectively used in the optical filter structure of the present invention, prevent the temperature increase in the sample chamber to a greater extent than the glass filter A, but are inferior to the glass filters B and C.

However, when each of the glass filters is combined with the aquafilter to form an optical filter structure, each of the phosphate glass filter of Example 1 and the fluorophosphate glass filter of Example 3 synergistically functions with the aquafilter and more remarkably prevents the temperature increase in the sample chamber than any one of the glass filters A and C. In addition, the glass filter B is found to have an effect on preventing the temperature increase in the sample chamber, whereas it is very poor in solarization resistance as described before.

The optical filter structure of the present invention shall not be limited to the optical filter structures formed in the above Examples 1 to 3, and the optical filter structure of the present invention includes a diversity of variants and application examples.

Figure 8:
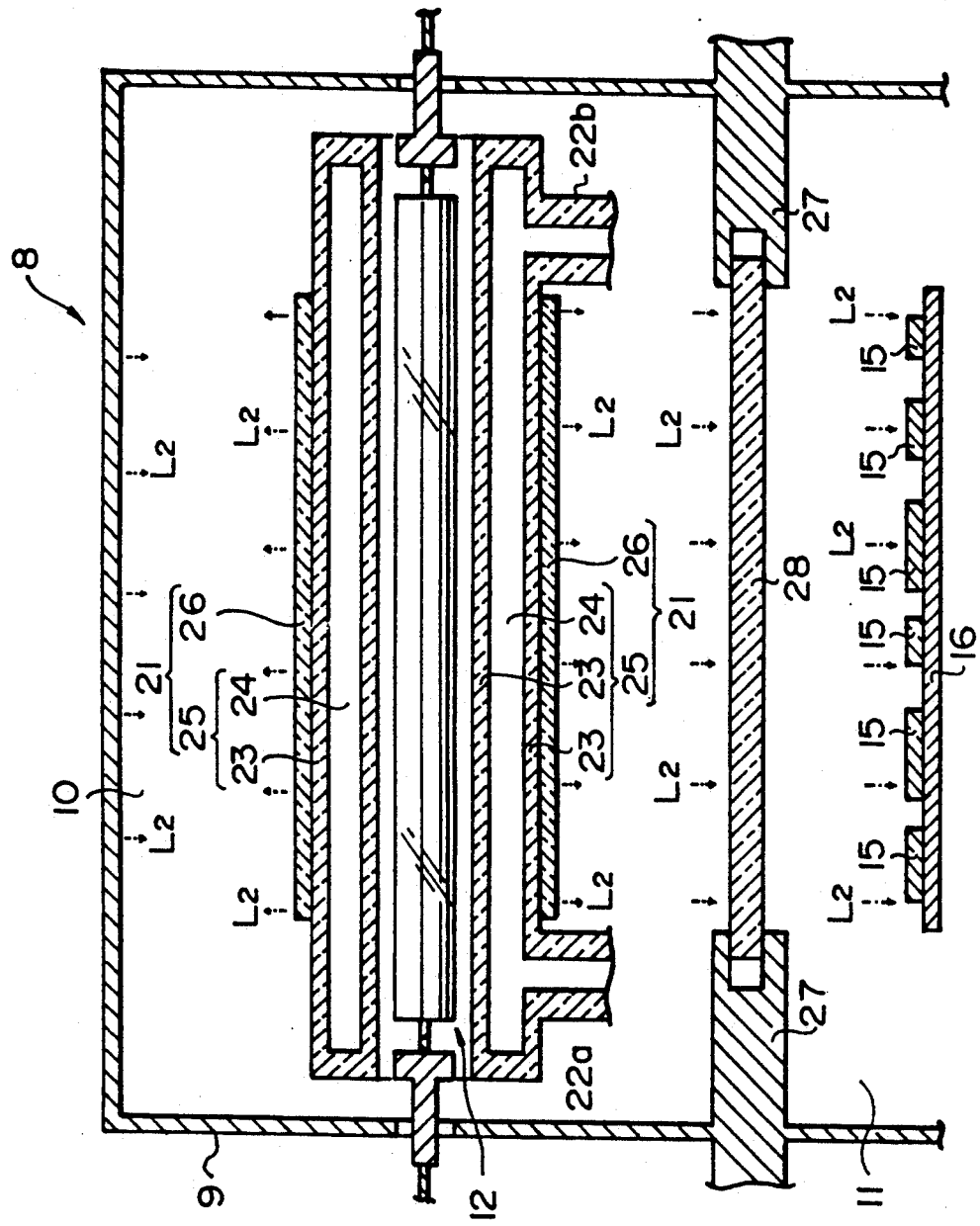
FIG. 8 is another schematic view of an accelerating weathermeter using an optical filter structure of the present invention.

For example, although the optical filter structures in Examples 1 to 3 have the form of a plate, the optical filter structure of the present invention may have the form of a cylinder as shown in FIG. 8, which shows an accelerating weathermeter 8 similar to that in FIG. 1. The cylinder has a cross-section of a circle or a semi-circle. In an optical filter structure 21 shown in FIG. 8, a double tube-structured, silica glass jacket 23 having branch tubes 22a and 22b for supplying and discharging water and a liquid 24 for filter (corresponding to a liquid layer) supplied into the jacket 23 constitutes an aquafilter 25. And, a cylindrical glass filter 26 (filter of phosphate or fluorophosphate glass containing copper oxide) which is tightly attached to the outer surface of the aquafilter 25 (outer surface of a wall of the silica glass jacket 23) and the above aquafilter 25 constitute an optical filter structure 21. In the accelerating weathermeter 8 shown in FIG. 8, a wall 27 for partition, positioned on the boundary between a lamp chamber 10 and a sample chamber 11, is provided with silica glass 28 for a partition window, whereby the lamp chamber 10 and the sample chamber 11 are partitioned. Those members which are common between FIG. 8 and FIG. 1, other than the above specified, are indicated by the same numerals as those in FIG. 1, and explanations thereof are omitted.

Figure 9:
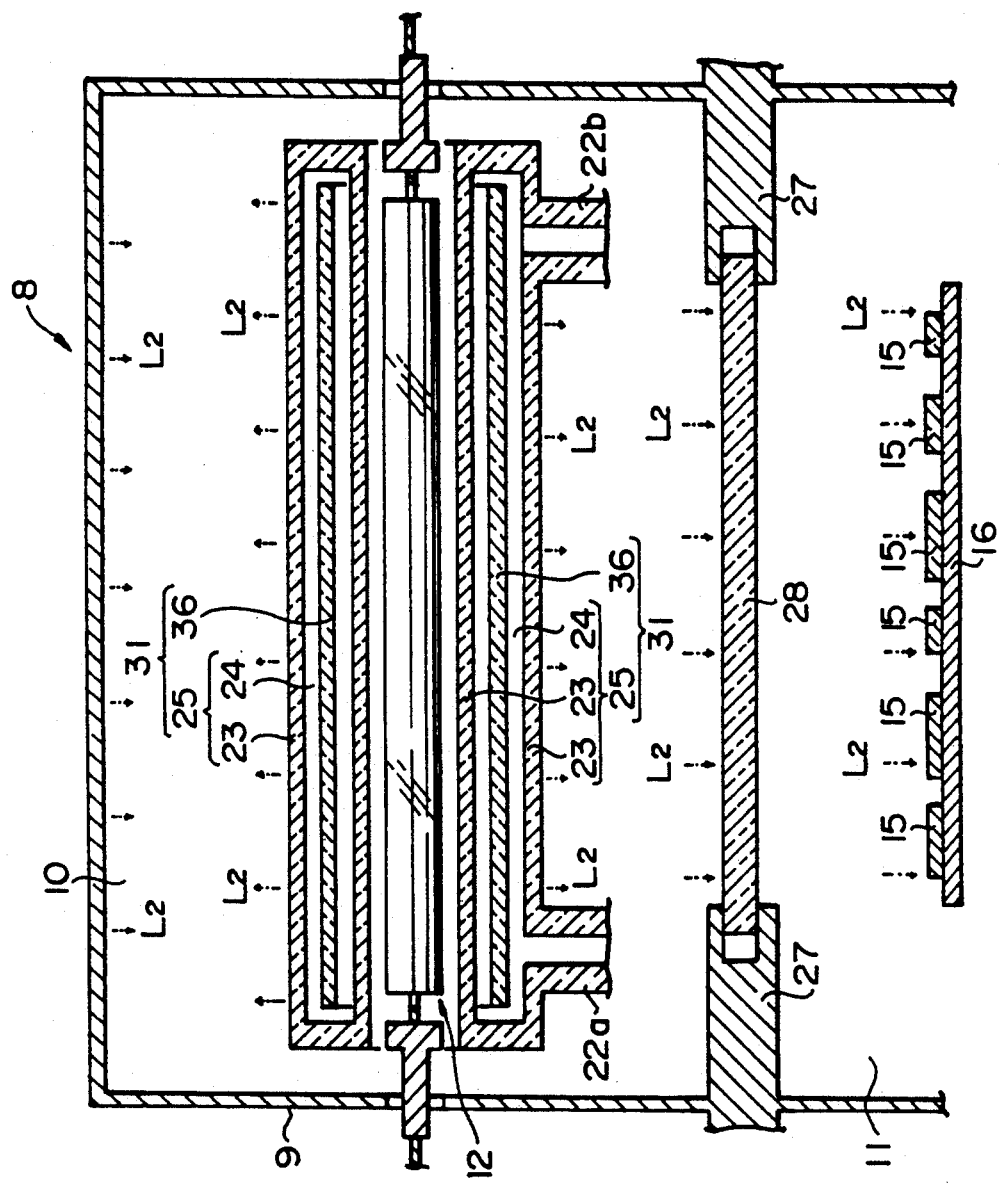
FIG. 9 is still another schematic view of an accelerating weathermeter using an optical filter structure of the present invention.
Figure 10:
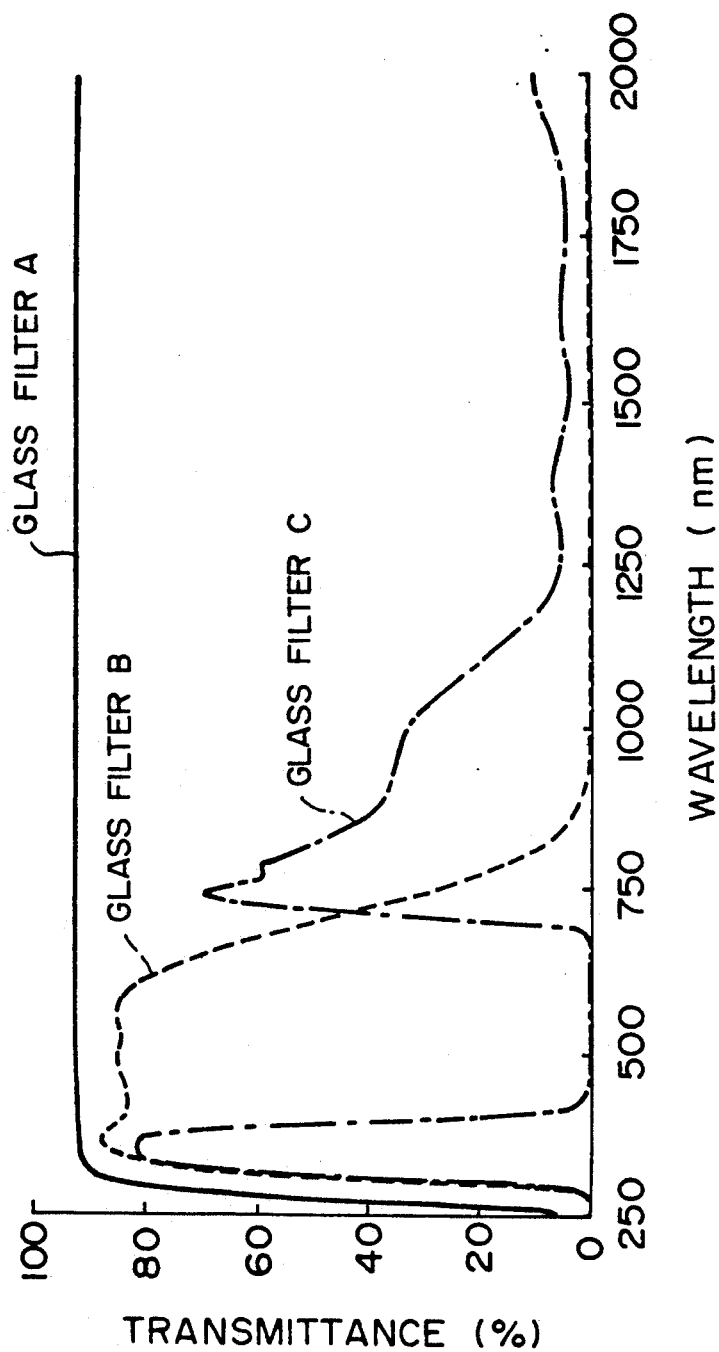
FIG. 10 shows transmittance curves of conventional glass filters A, B and C.

Further, the optical filter structure of the present invention may have a structure shown in FIG. 9, which shows an accelerating weathermeter 8 similar to that in FIG. 8. An optical filter structure 31 shown in FIG. 9 is constituted of an aquafilter 25 having the same constitution as that shown in FIG. 8 and a cylindrical glass filter 36(glass filter of phosphate or fluorophosphate containing copper oxide) provided within the aquafilter 25 (within a silica glass jacket 23). Those members which are common between FIG. 9 and FIG. 8, other than the above specified, are indicated by the same numerals as those in FIG. 8, and explanations thereof are omitted.

In addition, when a weathermeter using the optical filter structure 1 structured as shown in FIG. 1 is manufactured, a coating (e.g., a fluorine resin coating) excellent in solarization resistance, heat resistance and humidity resistance may be formed on the glass filter 7 instead of sealing with the high-purity silica glass 17. The glass filter 7 used in Example 1 may be formed of a plurality of glass plates as required. In this case, if the each glass plate has high accuracy after manufactured, it is sufficient to tightly attach the glass plates to each other. However, when light leaks from a gap of the bonded interface, the gap may be sealed with an adhesive, a tape or a metal. When an optical filter structure of which the constituents are held with the frame 3 as in the optical filter structure 1 described in Example 1 is applied to a weathermeter, it is preferred to bond the constituents with a silicone rubber, etc., for preventing the leakage of water from the aquafilter or for preventing the penetration of moisture from the sample chamber to the glass filter portion.

The optical filter structure of the present invention not just can be applied to the light source device of a weathermeter, but also can be applied to a variety of optical measuring apparatus, optical testers, printing-related apparatus, resin-curing apparatus, biochemistry-related apparatus and lightening apparatus by combining it with a variety of artificial light sources such as a metal halide lamp, a halogen lamp, a carbon arc lamp, a mercury lamp and an incandescent lamp.

As specified above, the optical filter structure provided by the present invention is excellent in solarization resistance, efficiently cuts off infrared light including near infrared light and ultraviolet light having a short wavelength, and is sufficiently permeable to visible light. When the optical filter structure of the present invention is used in combination with an artificial light source, a temperature increase in an irradiated substance can be prevented even if the output of the artificial light source is increased, and light stable in a spectral distribution and a light quantity can be radiated for a long period of time.

What is claimed is:

1. An optical filter structure (I) comprising a glass filter formed of phosphate or fluorophosphate glass containing 0.1 to 5% by weight, as an oxide, of copper oxide and an aquafilter having a liquid layer having a light path length of 3 to 50 mm, (II) said glass filter being positioned outside a wall of a container of said aquafilter or within said liquid layer, and (III) an absorption edge on a short wavelength side being in the range of from 250 to 330 nm, and the maximum of a spectral transmittance for light on a long wavelength side beyond 780 nm being not more than 40%.

2. An optical filter structure according to claim 1, wherein the aquafilter has a light-incoming surface formed of silica glass and a light-outgoing surface formed of silica glass.

3. An optical filter structure according to claim 1, wherein the phosphate glass has a following composition,

| (as oxides) | | |
| --- | --- | --- |
| $P_2O_5$ | 40-85 wt % | |
| $Al_2O_3$ | 3-20 wt % | |
| RO | 0-30 wt % | (RO is oxide of divalent metal) |
| $R_2O$ | 0-10 wt % | ($R_2O$ is oxide of monovalent metal) |
| RO + $R_2O$ | 3-40 wt % | |

4. An optical filter structure according to claim 1, wherein the fluorophosphate glass has a following composition,

| (as oxides, excluding F) | | |
| --- | --- | --- |
| $P_2O_5$ | 5-45 wt % | |
| $Al_2O_3$ | 2-25 wt % | |
| RO + $R_2O$ | 7-60 wt % | (RO is oxide of divalent metal and $R_2O$ is oxide of monovalent metal) |
| F | 5-30 wt % | |

5. An optical filter structure according to claim 1, wherein the phosphate or fluorophosphate glass contains a colorant selected from Ni, Co, Mn, Cr, Ti, Ce and Nd.

6. An optical filter structure according to claim 1, which has the form of a plate.

7. An optical filter structure according to claim 6, wherein the aquafilter is constituted by (i) a container having two parallel, plane, colorless silica glass plates held at a predetermined interval as a light-incoming surface and a light-outgoing surface and (ii) a liquid contained in the container.

8. An optical filter structure according to claim 6, wherein the glass filter is placed on the light-outgoing side of the aquafilter.

9. An optical filter structure according to claim 8, wherein the glass filter is placed in close contact with a container wall of the aquafilter.

10. An optical filter structure according to claim 1, which has the form of a cylinder whose cross-section is a circle or a semi-circle.

11. An optical filter structure according to claim 10, wherein the aquafilter is constituted by (i) a double tube-structured, silica glass jacket and (ii) a liquid for filter supplied into the jacket.

12. An optical filter structure according to claim 11, wherein the glass filter having the form of a cylinder whose cross-section is a circle or semi-circle is tightly attached to an outer surface of a wall of the silica glass jacket.

13. An optical filter structure according to claim 11, wherein the glass filter having the form of a cylinder whose cross-section is a circle or semi-circle is provided within the aquafilter.

14. A weathermeter which comprises an optical filter structure (I) comprising a glass filter formed of phosphate or fluorophosphate glass containing 0.1 to 5% by weight, as an oxide, of copper oxide and an aquafilter having a liquid layer having a light path length of 3 to 50 mm, (II) said glass filter being positioned outside a wall of a container of said aquafilter or within said liquid layer, and (III) an absorption edge on a short wavelength side being in the range of from 250 to 330 nm, and the maximum of a spectral transmittance for light on a long wavelength side beyond 780 nm being not more than 40%.

15. A weathermeter according to claim 14, wherein the optical filter structure has the form of a plate.

16. A weathermeter according to claim 15, wherein a lamp chamber including an artificial light source and a sample chamber including a bed on which a sample is to be placed are partitioned with the optical filter structure.

17. A weathermeter according to claim 14, wherein the optical filter structure has the form of a cylinder whose cross-section is a circle or semi-circle.

18. A weathermeter according to claim 17, wherein the aquafilter is constituted by a double tube-structured, silica glass jacket and a liquid for filter supplied into the jacket; an artificial light source is positioned in a space defined by an inner wall of the cylindrical jacket constituting the aquafilter; and a lamp chamber including the artificial light source and a sample chamber including a bed on which a sample is to be placed are partitioned by a partition wall formed of silica glass.

19. A weathermeter according to claim 18, wherein the cylindrical glass filter is tightly attached to an outer surface of the aquafilter.

20. A weathermeter according to claim 18, wherein the cylindrical glass filter is provided within the aquafilter.

* * * * *